(12) United States Patent
Shimanuki

(10) Patent No.: US 8,262,013 B2
(45) Date of Patent: Sep. 11, 2012

(54) REEL HUB

(75) Inventor: Hiroyuki Shimanuki, Tokyo (JP)

(73) Assignee: NECEmbeddedProducts, Ltd., Tokyo (JP)

( * ) Notice: Subject to any disclaimer, the term of this patent is extended or adjusted under 35 U.S.C. 154(b) by 430 days.

(21) Appl. No.: 12/534,371

(22) Filed: Aug. 3, 2009

(65) Prior Publication Data

US 2010/0032513 A1 Feb. 11, 2010

(30) Foreign Application Priority Data

Aug. 7, 2008 (JP) ................................. 2008-204205

(51) Int. Cl.
B65H 75/28 (2006.01)

(52) U.S. Cl. .................................. 242/532.6; 242/332.4

(58) Field of Classification Search .................. 242/332, 242/332.4, 332.7, 332.8, 532.1, 532.6, 532.7, 242/582; 360/93, 95, 96.5, 99.02, 99.03

See application file for complete search history.

(56) References Cited

U.S. PATENT DOCUMENTS

| | | | | |
|---|---|---|---|---|
| 3,740,001 A * | 6/1973 | Wroblewski | ............... | 242/332.1 |
| 3,783,200 A * | 1/1974 | Jantzen et al. | ................ | 360/85 |
| 3,984,067 A * | 10/1976 | Nagahiro et al. | .......... | 242/332.7 |
| 4,330,096 A * | 5/1982 | Bartel et al. | ............... | 242/532.1 |
| 6,398,142 B1 * | 6/2002 | Kletzl et al. | ............... | 242/332.4 |
| 7,540,443 B2 * | 6/2009 | Nishimura et al. | ........ | 242/332.4 |
| 7,913,943 B1 * | 3/2011 | Vanderheyden et al. | .. | 242/332.4 |

FOREIGN PATENT DOCUMENTS

| | | |
|---|---|---|
| JP | 2002216408 A | 8/2002 |
| JP | 2003203459 A | 7/2003 |
| JP | 2007280474 A | 10/2007 |

OTHER PUBLICATIONS

Japanese Office Action for JP2008-204205 mailed on May 8, 2012.

* cited by examiner

*Primary Examiner* — William A Rivera

(57) ABSTRACT

A reel hub has a slot into which a leader block with a hook part holding a leader pin fixed to a beginning of a tape is inserted. The reel hub includes: a lever rotatably supported by the main body part and urged such that an end of the lever abuts the leader block inserted into the slot; and a lid rotatably supported by the main body part, urged in a direction to close the slot, restricted to rotate by other end of the lever when the leader block is not inserted, and forms a cylindrical surface together with the main body part when the lid covers the slot. When the leader block is inserted, the lever is pushed by the leader block to be rotated, the other end of the lever is separated from the lid, and the restriction of the rotation of the lid is canceled.

6 Claims, 10 Drawing Sheets

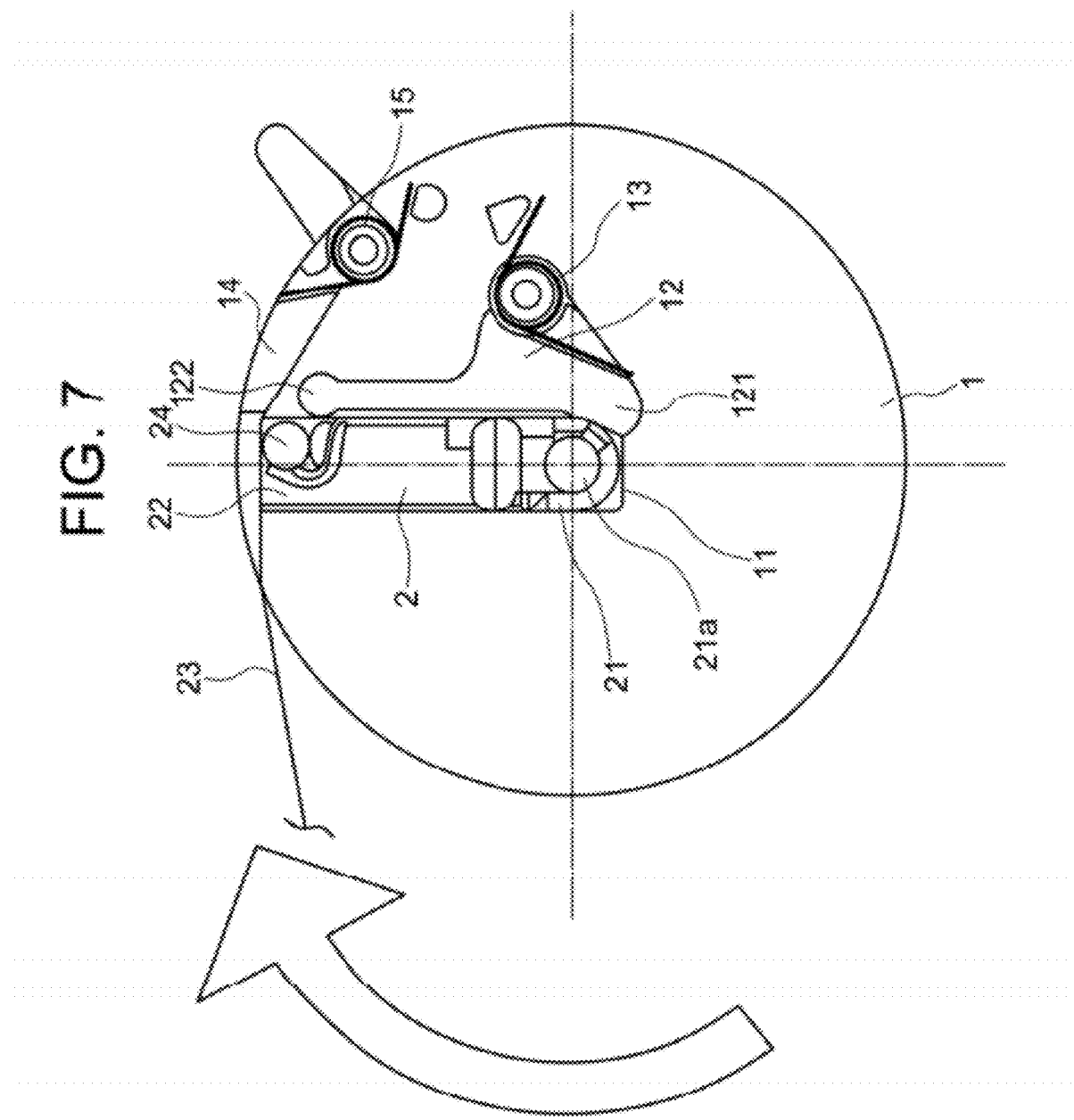

REEL HUB

CROSS-REFERENCE TO RELATED APPLICATION

This application is based upon and claims the benefit of priority from Japanese patent application No. 2008-204205, filed on Aug. 7, 2008, the disclosure of which is incorporated herein in its entirety by reference.

BACKGROUND OF THE INVENTION

1. Field of the Invention

The present invention relates to a reel hub for winding a tape.

2. Description of the Related Art

As a method of fixing a beginning of a tape to a reel, there is a method with which a leader pin provided at the beginning of a tape is engaged to a hook part 31 of the leader block 30 as shown in FIG. 8A, and the leader block 30 is inserted into a slot formed in a reel hub. With this method, the leader block forms a part of a barrel of the reel.

A magnetic tape recording device has been improved to realize an increase in recording density, an extension of the length of the tape, and an increase in running velocity of the tape, for the purpose of implementation of higher-capacity recording and high-speed reading/writing. If those features described above are achieved, the length of the tape can be extended, and the reel can rotate at higher speed. When the extension of the length of the tape is achieved, the diameter of the reel with the total content of the wound tape is intended to be sustained by thinning the thickness of the tape.

When the length of the tape is extended, the number of windings of the tape on the reel increases, and a tape is wound harder on the reel, thus a leader block is pressed in a radial direction of the reel hub by the wound tape. One side of a hook part 31 of the leader block 30 is opened as shown in FIGS. 8A and 8B. Therefore, when the leader block 30 is pressed in the radial direction of the reel hub 32, open side of the hook part 31 is pushed into a slot 33 of the reel hub 32 deeply as shown in FIGS. 8B and 9, and a level difference is generated at a boundary of the leader block and the reel hub.

The level difference becomes a cause of a non-uniform winding of the tape particularly when the tape thickness is being thinner as shown in FIG. 9, and the non-uniform winding of the tape causes an non-uniformity of the tape running velocity, and further, it causes a reading/writing error of the high-density recorded data.

As a technique related to solving the problems described above, there is a "reel" disclosed in Japanese Unexamined Patent Publication 2003-203459 (Patent document 1). The invention disclosed in Patent document 1 is configured to eliminate the level difference from the boundary of the leader block and the reel hub and prevent the tape from being wound non-uniformly, by arranging a cover in a shape of a flat spiral spring on the reel hub and winding the tape on the cover.

In Patent document 1, the flat spiral spring is in a spiral shape when no load is applied, and deformed to be a circular shape to follow the shape of the reel hub when the tape is wound. Therefore, the force of the flat spiral spring to restore is required to be sufficiently smaller than the force applied by the tape to be wound.

However, if the elasticity of the flat spiral spring is too small, the spring cannot maintain its own shape when no load is applied, and the flat spiral spring 34 may be ruckled as shown in FIG. 10A or a tip edge part of the flat spiral spring 3 may be hung down as shown in FIG. 10B. If the tape is wound with such state, it causes a non-uniform winding.

That is, the invention disclosed in Patent document 1 is not configured to prevent the tape from being wound non-uniformly.

SUMMARY OF THE INVENTION

The present invention is achieved in view of such problems, and an exemplary object of the invention is to provide a reel hub with which the generation of the non-uniform winding can be prevented.

In order to achieve the above described object, a reel hub according to an exemplary aspect of the invention is a reel hub having a slot, formed on a main body part, into which a leader block with a hook part for holding a leader pin fixed to a beginning of a tape is inserted. The reel hub includes: a lever which is rotatably supported by the main body part in a state of being urged such that an end of the lever abuts the leader block inserted into the slot; and a lid which is rotatably supported by the main body part in a state of being urged in a direction to close the slot, restricted to rotate by other end of the lever when the leader block is not inserted in the slot, and forms a cylindrical surface together with the main body part when the lid covers the slot, in which, when the leader block is inserted in the slot, the lever is pushed by the leader block to be rotated, the other end of the lever is separated from the lid, and the restriction of the rotation of the lid is canceled.

BRIEF DESCRIPTION OF THE DRAWINGS

FIG. 7 is an illustration showing a state when a main body part of the reel hub in which the leader block is inserted is rotated further;

DETAILED DESCRIPTION OF THE EXEMPLARY EMBODIMENTS

Figure 1:
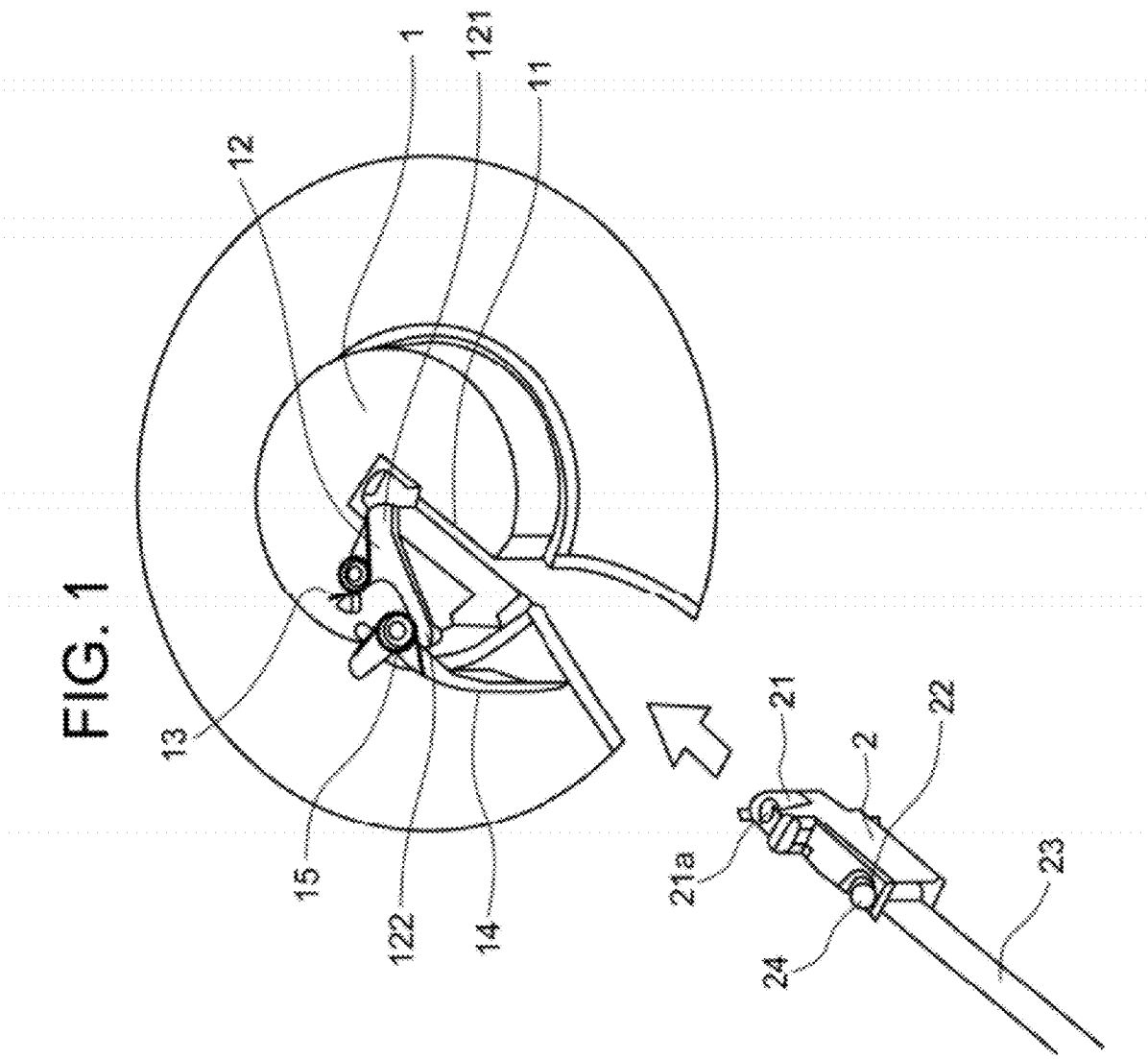
FIG. 1 is an illustration showing a configuration of a reel hub according to an exemplary embodiment of the invention.

Here, an exemplary embodiment of the invention will be described by referring to the drawings.

A configuration of the reel hub according to the exemplary embodiment is shown in FIG. 1. In FIG. 1, an upper flange is omitted for easier understanding of the configuration of the reel hub. The reel hub according to the exemplary embodiment is the reel hub having a slot 11, formed on a main body part 1, into which a leader block 2 with a hook part 22 for holding a leader pin 24 fixed to a beginning of a tape 23 is inserted. The reel hub includes: a lever 12 which is rotatably supported by the main body part 1 in a state of being urged such that one end 121 of the lever abuts the leader block 2 inserted into the slot 11; and a lid 14 which is rotatably supported by the main body part 1 in a state of being urged in a direction to close the slot 11, restricted to rotate by other end 122 of the lever 12 when the leader block 2 is not inserted in the slot 11, and forms a cylindrical surface together with the main body part 1 when the lid 14 covers the slot 11, in which, when the leader block 2 is inserted in the slot 11, the lever 12 is pushed by the leader block 2 to be rotated, the other end 122 of the lever 12 is separated from the lid 14, and the restriction of the rotation of the lid 14 is canceled.

The reel hub according to the exemplary embodiment of the invention will be specifically described further.

The leader block 2 to be inserted in the slot 11 of the main body part 1 includes a supporting part 21 for engaging with the main body part 1 and a hook part 22 for holding the leader pin 24 fixed to the beginning of a tape 23. The supporting part 21 includes a hole 21a through which a pin is inserted when carrying the leader block 2, and the hole 21a is brought to be positioned at a shaft center of the reel hub when the leader block 2 is loaded into the main body part 1. Note that, since a known configuration can be applied for the supporting part 21 and the hook part 22, a detailed explanation thereof is omitted.

A lever 12 is rotatably provided at a closed side of the slot 11 of the main body part 1, that is, at neighborhood of a side where the supporting part 21 of the leader block 2 abuts. The lever 12 includes one end 121 extending to the closed side of the slot 11 and other end 122 extending to the open side of the slot 11, and the one end 121 is urged by a first spring 13 so as to contact with the leader block 2 when the leader block 2 is inserted in the slot 11. Further, a lid 14 which opens/closes the open side of the slot 11 is rotatably provided at the main body part 1. The lid 14 is urged by a second spring 15 to close the open side of the slot 11.

When the leader block 2 is not inserted in the slot 11, the other end 122 of the lever 12 abuts the lid 14 by the urging force of the first spring 13 to restrict the rotation of the lid 14.

The urging force of the second spring 15 is weaker than the urging force of the first spring 13. In other words, the torque to be generated by the first spring 13 at a contact point of the other end 122 of the lever 12 and the lid 14 is larger than the torque to be generated by the second spring 15 at the same contact point, and the lid 14 is not rotated when the other end 122 of the lever 12 is abutted. Also, the urging force of the second spring 15 is set to be weaker than the tensile force of a tape 23 attached to the leader pin 24. An outer side of the lid 14 is made to be an arc, and it is coupled with the main body part 1 to form a cylindrical surface with no level difference when the lid 14 covers the slot 11. A peripheral surface of the main body part 1 of the reel hub and the arc shape surface of the lid 14 are coupled to form the cylindrical tape take-up face. Here, by using a material, whose rigidity is higher than that of the main body part 1, for the lid 14, the deformation due to the wound tape is suppressed and the non-uniform winding of the tape can be suppressed more surely.

Although any shaped spring can be applied for the first spring 13 and the second spring 15, the lever 12 and the lid 14 can be urged more stably in a prescribed direction by using a helical spring as illustrated.

Next, a case of loading the leader block 2 into the main body part 1 of the reel hub will be described by using FIGS. 2-7. In a following explanation, an upper flange and a lower flange are omitted for easier understanding.

Figure 2:
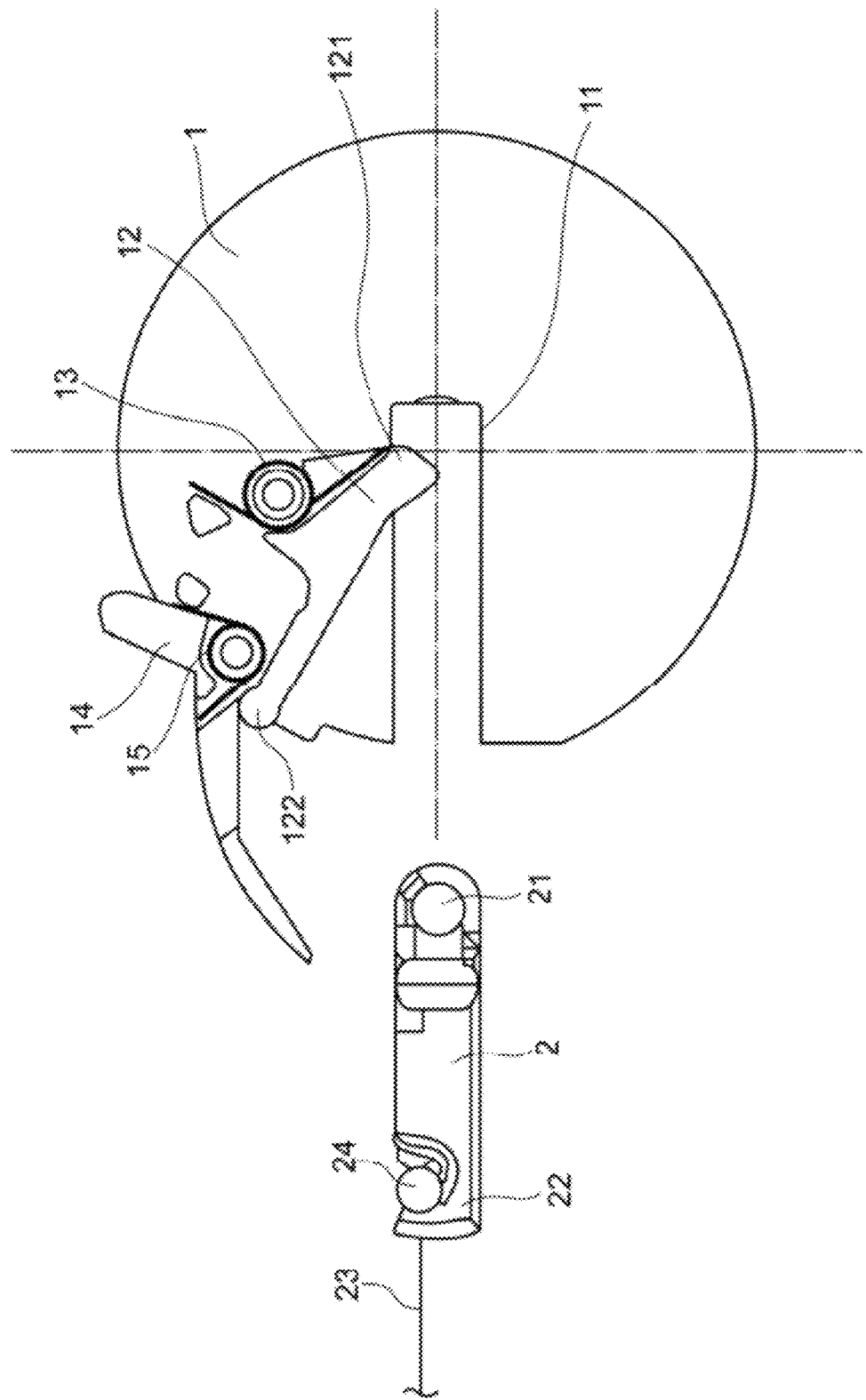
FIG. 2 is an illustration showing a state of the reel hub when the leader block is not inserted.

As shown in FIG. 2, when the leader block 2 is not inserted in the slot 11, the one end 121 of the lever 12 is arranged to be protruded at the closed side of the slot 11 by the urging force of the first spring 13 so as to abut the leader block 2 if the leader block 2 is inserted.

Figure 3:
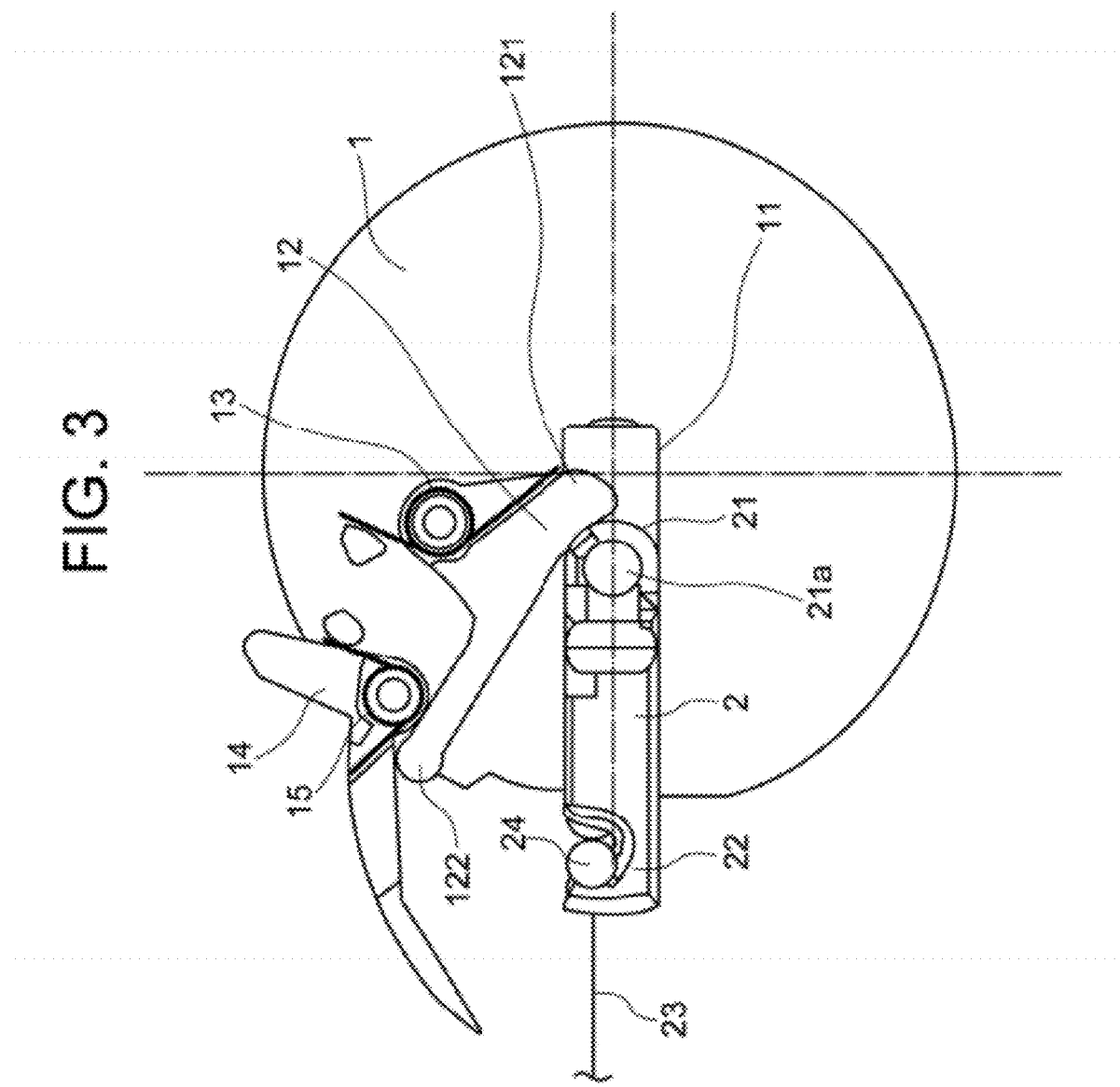
FIG. 3 is an illustration showing a state when the leader block is inserted in a slot to abut the lever.

As shown in FIG. 3, the leader pin 24 attached to the beginning of the tape 23 is engaged to the hook part 22 of the leader block 2, and the leader block 2 is inserted in a half way of the slot 11 of the main body part 1. Then, the supporting part 21 of the leader block 2 abuts the one end 121 of the lever 12 protruded into the slot 11. With this state, since the lever 12 is not applied such a force to overcome the spring force of the spring 13 from the leader block 2, the lever 12 is urged by the first spring 13 and held to be such a state as being protruded into the slot 11, and the lever 12 is not rotated by a contact with the leader block 2 only.

Figure 4:
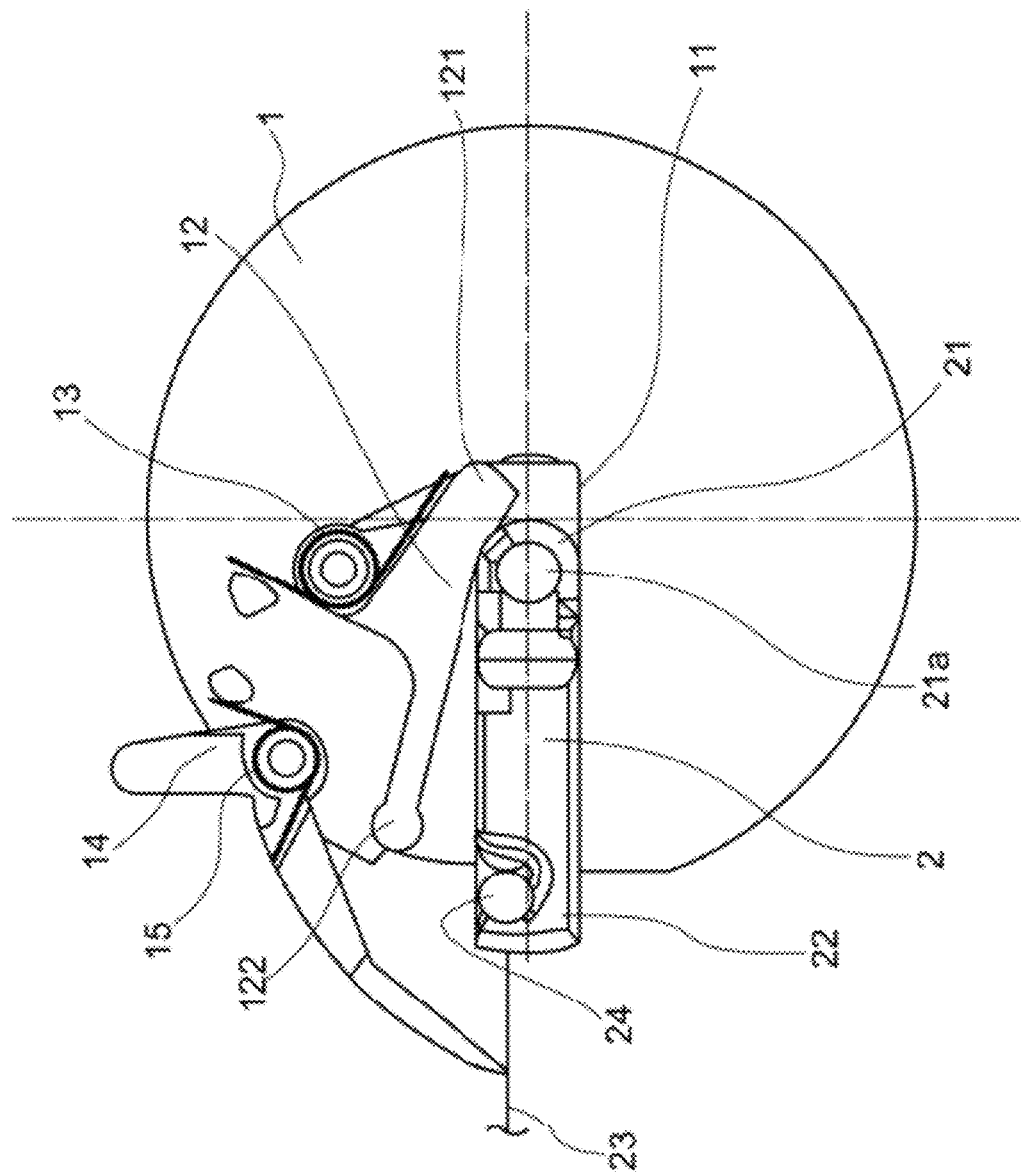
FIG. 4 is an illustration showing a state when the lever is pushed by the leader block being inserted in the slot.

As shown in FIG. 4, when the leader block 2 is inserted further into the slot 11 by overcoming the spring force of the spring 13, the lever 12 receives the force from the leader block 2, then the lever 12 rotates and the one end 121 retreats from the slot 11 to the outside, by overcoming the urging force of the first spring 13. When the one end 121 of the lever 12 retreats from the slot 11, the other end 122 of the lever 12 disengages from the lid 14. With this, the lid 14 becomes rotatable state, and rotates in a direction to cover the open side of the slot 11 by the urging force of the second spring 15. In this case, the supporting part 21 of the leader block 2 does not abut the closed side of the slot 11 completely, and the tensile force of the tape 23 extended from the leader block 2 is greater than the urging force of the second spring 15, so the rotation of the lever 12 stops where the lid 14 contacts with the tape 24.

Figure 5:
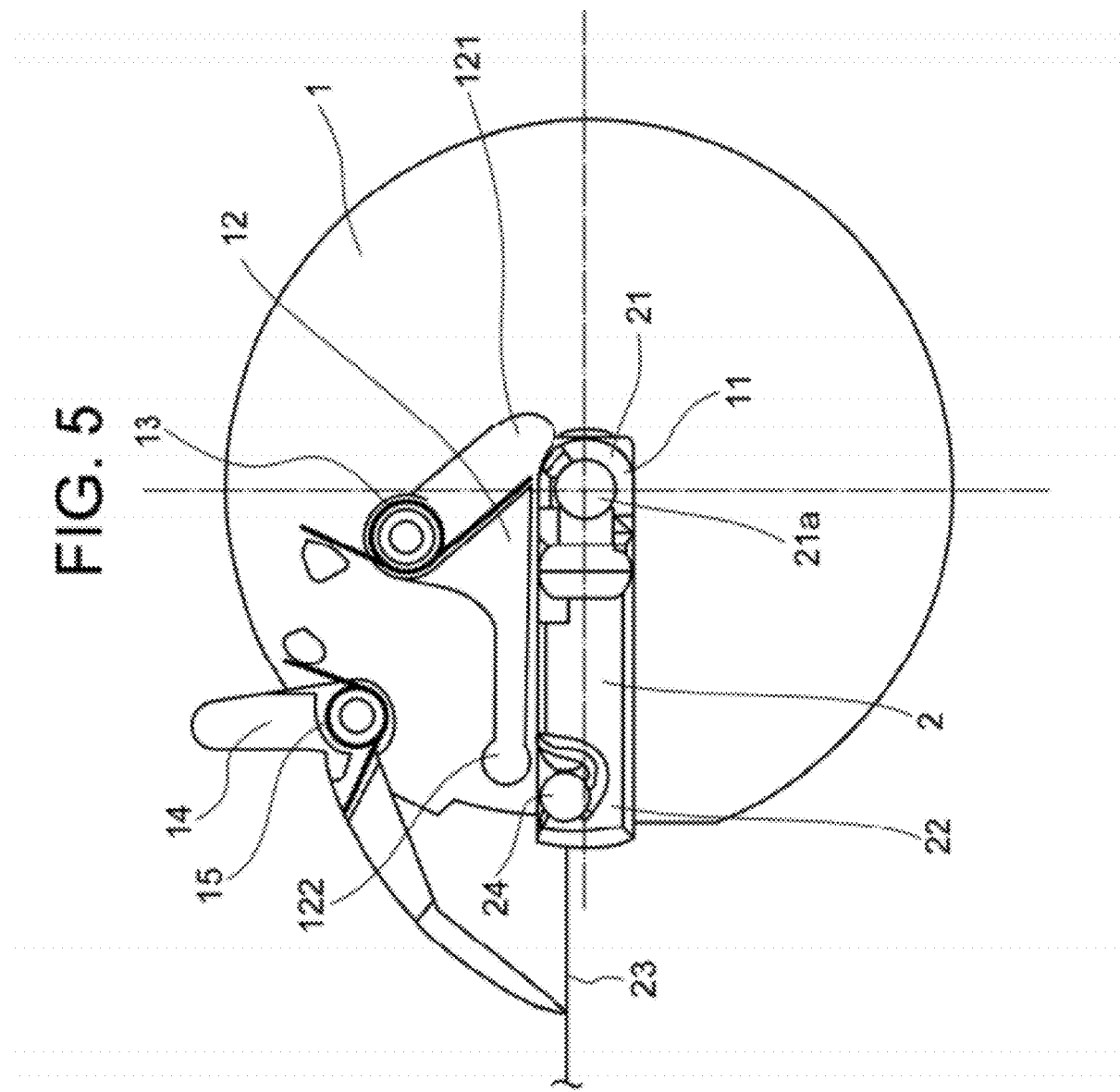
FIG. 5 is an illustration showing a state when the leader block is inserted in the slot completely.

As shown in FIG. 5, when the leader block 2 is completely inserted into the slot 11 of the main body part 1, the supporting part 21 of the leader block 2 abuts the closed side of the slot 11, the center of the hole 21a of the supporting part 21 coincides with the shaft center of the reel huh, and the reel huh becomes rotatable even when the pin or the like is being inserted in the hole 21a of the supporting part 21.

Figure 6:
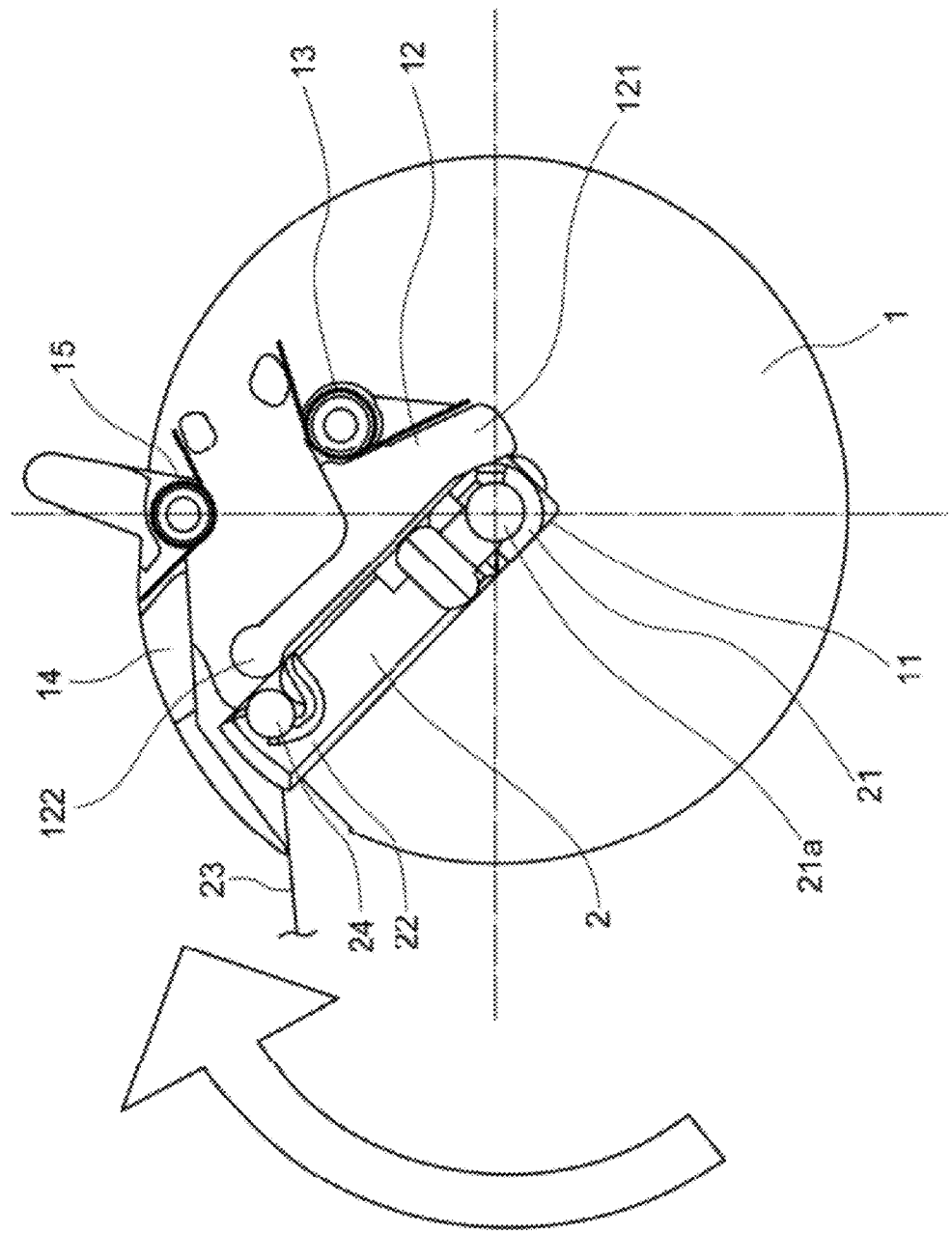
FIG. 6 is an illustration showing a state when a main body part of the reel hub in which the leader block is inserted is rotated.
Figure 8A:
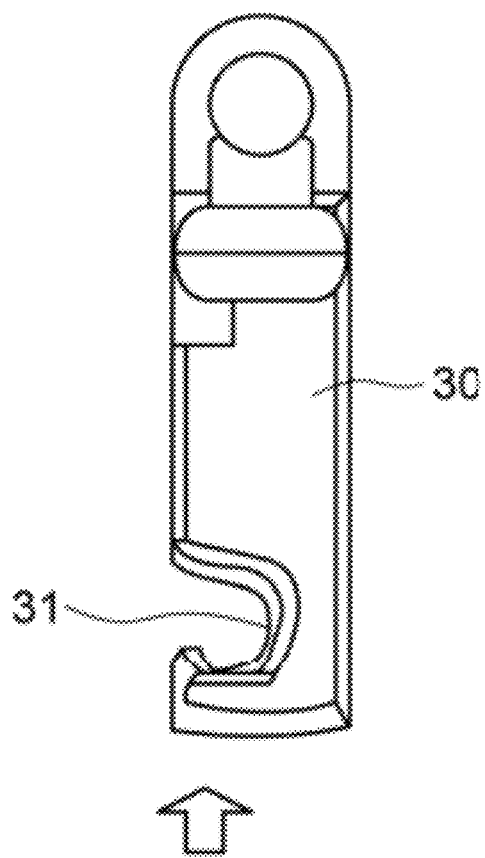
FIG. 8 is an illustration showing a configuration of a general-purpose leader block.
Figure 8B:
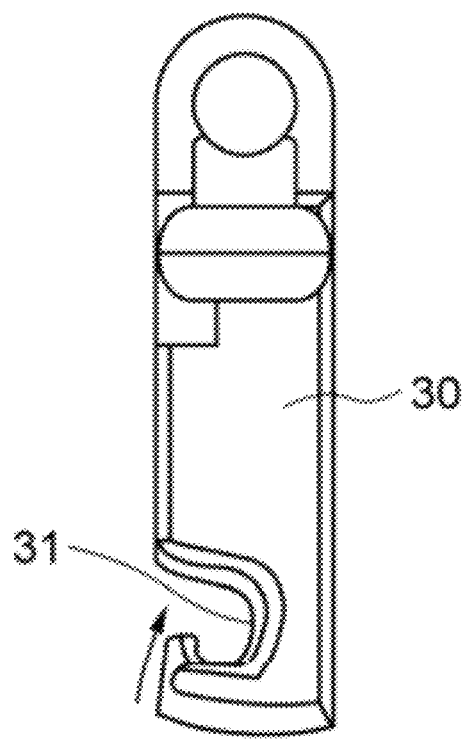
Figure 9:
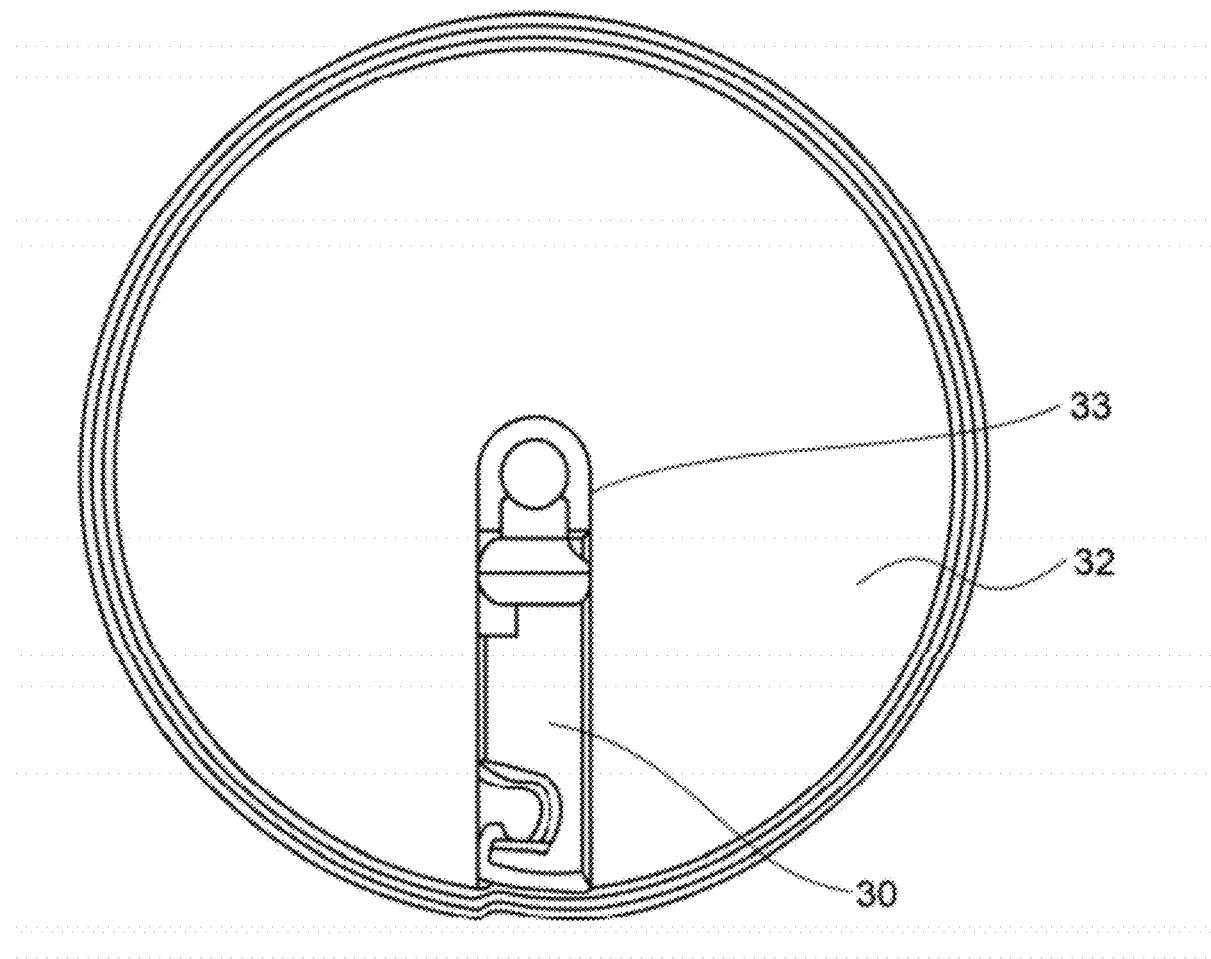
FIG. 9 is an illustration showing a state when a non-uniform winding is generated at a position of a level difference between the leader block and the reel hub due to a deformation of the leader block.
Figure 10A:
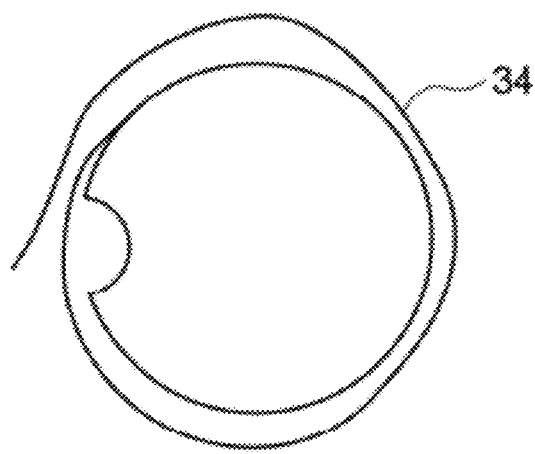
FIG. 10 is an illustration showing a state when a flat spiral spring is deformed when no load is applied.
Figure 10B:
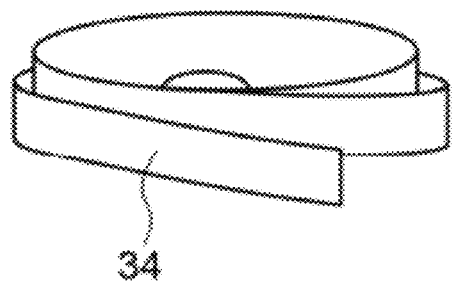

As shown in FIG. 6, when the main body part 1 is rotated in the clockwise direction together with the leader block 2 from the state in which the leader block 2 is completely inserted in the slot 11 as shown in FIG. 5, a portion where the tape 23 supports the end part of the lid 14 is brought close to the main body part 1 in accordance with the rotation of the reel hub, the lid 14 closes gradually by the urging force of the spring 15.

When the reel hub rotates in the clockwise direction further, as shown in FIG. 7, the tape 23 is wound along the outer spherical surface of the main body part 1, that is, along the cylindrical tape take-up face, and when the portion where the tape 23 supports the end part of the lid 14 contacts with the outer spherical surface of the main body part 1, the lid 14 becomes a completely closed state. With this state, since the lid 14 closes the open side of the slot 11, the outer spherical surface of the lid 14 is coupled with the spherical surface of the main body part 1, and the cylindrical tape take-up face is formed. In this state, the cylindrical surface with no level difference formed by the main body part 1 and the lid 14 is the barrel part of the reel. Therefore, the tape is wound by the reel without generating the non-uniform winding. As the result, when the beginning of the tape is fixed to the leader block 2 by engaging the leader pin with the hook part 22, the non-uniform winding is not formed by the tape.

As described, the reel hub according to the exemplary embodiment is capable of winding the tape without generating the non-uniform winding.

As an exemplary advantage according to the invention, it is possible to present a reel hub with which the generation of the non-uniform winding can be prevented.

Note that the exemplary embodiment described above is an example of preferred embodiments of the invention, and the invention is not limited to such case. For example, although the exemplary embodiment described above refers to a configuration in which the spring for urging the lever or the lid is the helical spring, it may be configured to urge by using a coil spring or the like. As seen above, the present invention can be modified variously.

INDUSTRIAL APPLICABILITY

By applying the present invention, it is possible to present the reel hub which prevents the generation of the non-uniform winding.

What is claimed is:

1. A reel hub having a slot, formed on a main body part, into which a leader block is inserted, a beginning of a magnetic tape fixed by a reel pin to the leader block, the reel hub including:
    a lever which is rotatably supported by the main body part, the lever including one end protruded at a closed side of the slot and an other end extending to an open side of the slot;
    a first spring provided at the main body part, the first spring urging the one end of the lever to move toward the slot and the other end to move away from the slot;
    a lid member which is rotatably supported by the main body part, a tip end part of the lid member being urged to close the open side of the slot from outside, and a rear end part of the lid member being abuttable to the other end of the lever at an inner side of the rear end part; and
    a second spring provided at the main body part, the second spring urging the tip end part of the lid member to move toward the open side of the slot,
    wherein, when the leader block is inserted in the slot and a tip portion of the leader block is fixed to a center of the main body part in a manner that the reel hub becomes rotatable, the lever is pushed by the tip portion of the leader block to be rotated, wherein the one end of the lever moves rotationally towards a direction away from the slot, and the other end of the lever moves rotationally toward a direction close to the slot, and
    wherein an arc shape surface of the lid member forms a cylindrical tape take-up face together with a peripheral surface of the main body part.

2. The reel hub as claimed in claim 1, wherein the lid member is urged in a direction to close the slot by a force weaker than a tensile force of the tape fixed to the leader pin.

3. The reel hub as claimed in claim 2, wherein the lid member released from restriction to rotate by the lever stops to rotate when the lid abuts the tape, and closes gradually pressed by a winding tape in accordance with the rotation of the main body part feel.

4. The reel hub as claimed in claim 1, wherein the torque generated by the first spring at a contact point of other end of the lever and the lid is larger than the torque generated by the second spring at a same contact point.

5. The reel hub as claimed in claim 4, wherein the first spring and the second spring are helical springs.

6. The reel hub as claimed in claim 1, wherein the lid member is formed from a material whose rigidity is higher than that of the main body part.

* * * * *